(12) United States Patent
McDonnell

(10) Patent No.: US 9,165,159 B1
(45) Date of Patent: Oct. 20, 2015

(54) ENCRYPTION BASED ON TOUCH GESTURE

(71) Applicant: Marvell International Ltd., Hamilton (BM)

(72) Inventor: Philip McDonnell, Lake Forest, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/152,863

(22) Filed: Jan. 10, 2014

Related U.S. Application Data

(60) Provisional application No. 61/751,097, filed on Jan. 10, 2013.

(51) Int. Cl.
| | |
|---|---|
| *G06F 21/62* | (2013.01) |
| *G06F 21/32* | (2013.01) |
| *G06F 21/31* | (2013.01) |
| *H04L 9/08* | (2006.01) |

(52) U.S. Cl.
CPC ............ *G06F 21/6218* (2013.01); *G06F 21/31* (2013.01); *G06F 21/32* (2013.01); *H04L 9/0866* (2013.01)

(58) Field of Classification Search
CPC ..... H04L 9/0866; H04L 9/0861; G06F 21/31; G06F 21/32; G06F 21/36; G06F 21/6218
USPC ......... 713/167, 156, 172; 726/19, 26; 380/44, 380/277
See application file for complete search history.

(56) References Cited

U.S. PATENT DOCUMENTS 8,638,939 B1 * 1/2014 Casey et al. .................... 380/277

FOREIGN PATENT DOCUMENTS

GB PCT/GB2011/052390 * 12/2011 ............ H04L 9/0866

OTHER PUBLICATIONS

Dirk Scheuermann et al: "On biometric key generation from handwritten signatures", BIOSIG'11, Proceedings of the Special Interest Group on Biometrics and Electronic Signatures, Sep. 8, 2011, pp. 103-114, XP55036216, ISBN: 978-3-88-579285-7.*

* cited by examiner

*Primary Examiner* — Kambiz Zand
*Assistant Examiner* — Noura Zoubair

(57) ABSTRACT

Some of the embodiments of the present disclosure provide a method comprising receiving an input from a touch input device. The input corresponds to a gesture produced by a user swiping a pattern on a surface of the touch input device. The method further comprises decomposing the gesture into segments, using a look-up table to determine alphanumeric elements that correspond to each of the segments, and assembling the alphanumeric elements into an encryption password.

20 Claims, 7 Drawing Sheets

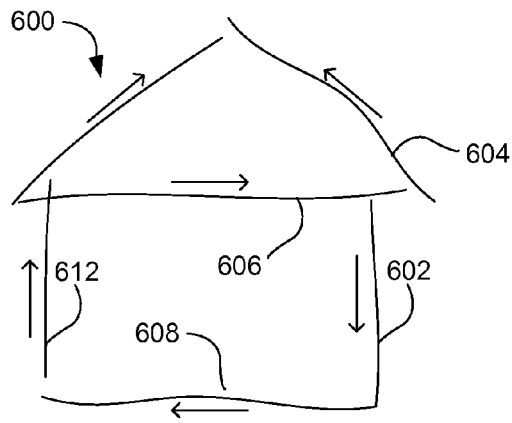
FIG. 6A
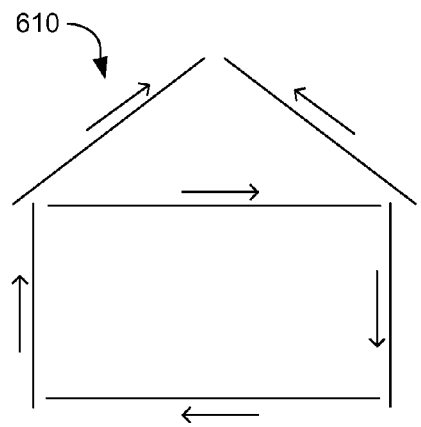
FIG. 6B
| Gesture segment | Code Element |
|---|---|
| ↑ | L |
| ↗ | J |
| ↙ | Q |
| → | R |
| ↓ | I |
| ← | K |
FIG. 7

1000

| Gesture segment | Code Element |
|---|---|
| (long line) | L |
| (double line) | J |
| (two arrows) | R |
| (circle-dash-circle) | K |

FIG. 10

ENCRYPTION BASED ON TOUCH GESTURE

CROSS REFERENCE TO RELATED APPLICATIONS

This claims priority to U.S. Provisional Patent Application No. 61/751,097, filed on Jan. 10, 2013, which is incorporated herein by reference.

TECHNICAL FIELD

Embodiments of the present disclosure relate to encryption key generation, and more particularly to document encryption based in part on touch gesture.

BACKGROUND

Unless otherwise indicated herein, the approaches described in this section are not prior art to the claims in the present disclosure and are not admitted to be prior art by inclusion in this section.

The rate of documents and electronic files transmitted via the Internet continues to increase, as does the importance of security of private information often included in the transmitted documents and electronic files. Encrypting private documents with a textual password, for example, allows two or more parties to share private electronic documents, like pictures or an archive, over an insecure channel, such as email or posting to a public file sharing website. In the case of encrypting private documents with a textual password for transmission over a channel, one party can share the textual password to another party over another channel. Such sharing can be verbal (e.g., telephone channel or VoIP channel), for example. Assuming the channel for transmitting the textual password is secure, the effectiveness of the security thus relies on the difficulty of guessing the textual password. Easy to guess textual passwords, such as "password", are considered insecure and textual passwords that add a number, such as "baloney1", are considered more secure. Textual passwords, such as "Is8i!br0tw", are very secure, but difficult to remember. Thus, there is a general inverse relationship between ease of remembering (and communicating to another party) a textual password and the level of security of the textual password.

SUMMARY

In various embodiments, the present disclosure provides a method comprising receiving an input from a touch input device. The input corresponds to a gesture produced by a user swiping a pattern on a surface of the touch input device. The method further comprises decomposing the gesture into segments, using a look-up table to determine alphanumeric elements that correspond to each of the segments, and assembling the alphanumeric elements into an encryption password.

In some embodiments, a system comprises a touch input device, a memory device including a look-up table, and a processor configured to receive an input from the touch input device. The input corresponds to a gesture produced by a user swiping a pattern in a surface of the touch input device. The processor is further configured to decompose the gesture into segments and, using the look-up table, determine alphanumeric elements that correspond to each of the segments. The processor is further configured to assemble the alphanumeric elements into an encryption password.

In some embodiments, a computer-readable storage medium stores computer-executable instructions that, when executed by a processor, configure the processor to receive an input from a touch input device. The input corresponds to a gesture produced by a user swiping a pattern on a surface of touch input device. The processor further decomposes the gesture into segments and, using a look-up table, determines alphanumeric elements that correspond to each of the segments. The processor further assembles the alphanumeric elements into an encryption password.

BRIEF DESCRIPTION OF THE DRAWINGS

In the following detailed description, reference is made to the accompanying drawings, wherein like numerals designate like parts throughout. The drawings illustrate a number of embodiments that illustrate principles of the present disclosure. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

FIGS. 6A and 6B illustrate an example touch gesture before and after a process that modifies a set of gesture swipes, according to some embodiments.

FIGS. 7-10 are tables of gesture segments and corresponding code elements, according to various embodiments.

DETAILED DESCRIPTION

Figure 1:
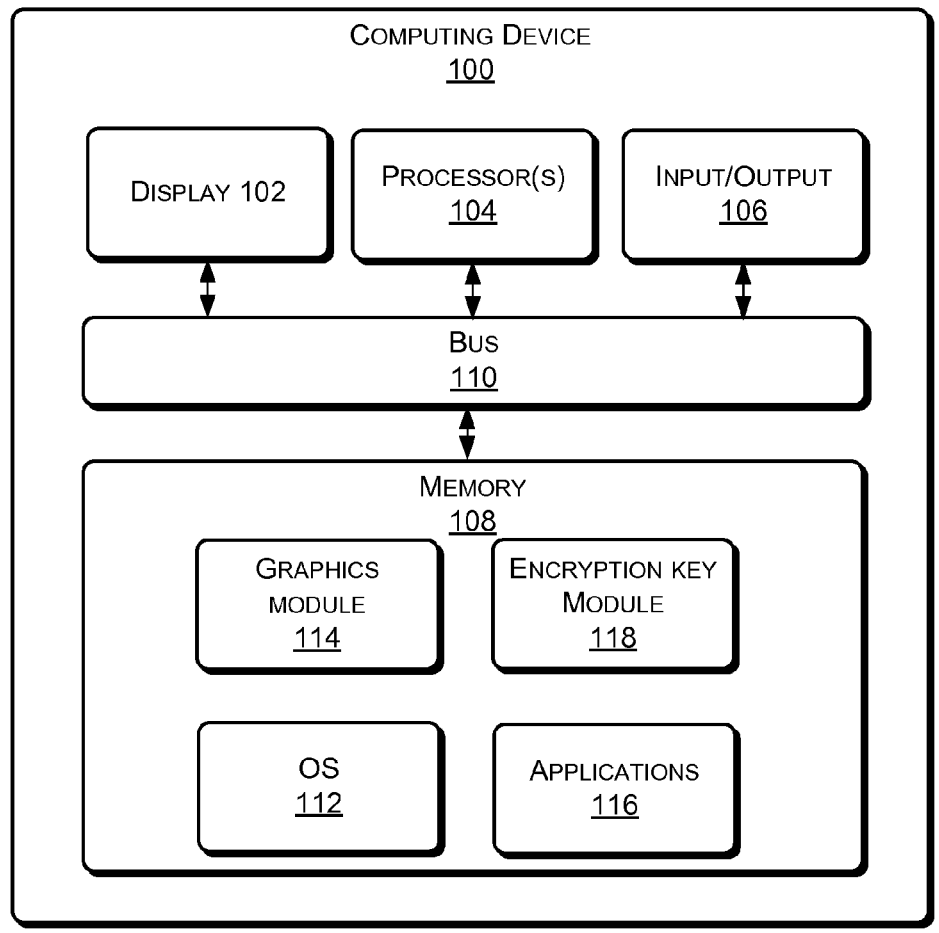
FIG. 1 is a block diagram of a host system or computing device, according to some embodiments.

In embodiments, a gesture from a touch input device is used to generate an encryption key. For example, a touch input device comprises a touch screen or a touch pad of an electronic device. Gestures can include a series or a set of partial gestures, or segments of a pattern swiped on the touch input device by a user. Each segment corresponds to one or more alphanumeric characters. Accordingly, a gesture can be converted to an alphanumeric word, which can subsequently be used as an encryption key or a password. Gestures comprising shapes, designs, or patterns can be relatively easy to remember. An encryption key generated from such a gesture can be relatively complex, and thus relatively secure (e.g., difficult to guess by an unauthorized party). Accordingly, a relatively complex and secure encryption key or password can be remembered in terms of an easy to remember gesture. Moreover, inputting a gesture-based encryption key into a device or system need not require a keyboard or keypad. Instead, a touch input device can be used. This can be an advantage to users with a visual handicap or limited dexterity, for example.

In some cases, when two or more parties share private electronic documents, such as photos or text, over an insecure channel (e.g., email or posting to a public file sharing website, a private communications network, and so on), the parties can encrypt the private electronic documents with an encryption key. The encryption key can be communicated among the parties over another channel. In the following example, two parties "A" and "B" agree upon a gesture to use as an encryption key, which can be communicated between parties "A" and "B" secretly over a secure channel. Party "A" has an electronic document that is desired to be private and secure. Party "A" thus encrypts the electronic document using the gesture. Party "A" can transmit the encrypted electronic document to party "B" over a public, insecure channel. Because the electronic document is encrypted, privacy and security are maintained even though the channel is public and insecure. Party "B" decrypts the electronic document using the gesture, and thus takes possession of the private and secure electronic document.

In some embodiments, gestures from a touch input device can be interpreted or decomposed into classified generic patterns. For example, two fingers swiping left to right or one finger swiping downward on a touch input device are two examples of generic patterns or segments of a gesture. Exact points of gesture swipes sensed by the touch input device can vary each time they are input. The gesture swipes, however, can be generalized or approximated into classifications of gesture segments. In other words, gesture segments need not be well-formed or precise: the gesture segments only need to be distinct from one another. Gesture segments, for example, can include vertical lines, horizontal lines, diagonal lines, arcs, loops, and so on. The gesture segments can subsequently be used to form elements of an alphabet and/or numbers, and a sequence of the gesture segments can be used to form a unique word that can be used as a password for encryption.

FIG. 1 is a block diagram depicting a computing device 100 in which embodiments involving touch gesture-based encryption as described herein may be implemented. Computing device 100 can comprise any type of device with that includes a display 102, one or multiple processors 104 operably connected to an input/output interface 106 and memory 108, e.g., via a bus 110. Computing device 100 can include personal computers such as, for example, desktop computers, laptop computers, tablet computers, telecommunication devices, personal digital assistants (PDAs), electronic book readers, wearable computers, automotive computers, gaming devices, etc. In some embodiments, computing device 100 can include, for example, components for integration in a computing device, appliances, or another sort of device. In some embodiments, some or all of the functionality described as being performed by computing device 100 may be implemented by one or more remote peer computing devices, a remote server or servers, or a cloud computing resource. For example, computing device 100 can execute applications that are stored remotely from the computing devices.

In some embodiments, memory 108 can store instructions executable by the processor(s) 104 including an operating system (OS) 112, a graphics module 114, and programs or applications 116 that are loadable and executable by processor(s) 104. Processor(s) 104 may include central processing units (CPUs), graphics processing units (GPUs), video buffer processors, and so on. In some implementations, an encryption key module 118 comprises executable code stored in memory 108 and is executable by processor(s) 104. Encryption key module 118 can include a look-up table comprising a list of gesture segments and alphanumeric elements that correspond to each of the segments.

Though certain modules have been described as performing various operations, the modules are merely one example and the same or similar functionality may be performed by a greater or lesser number of modules. Moreover, the functions performed by the modules depicted need not necessarily be performed locally by a single device. Rather, some operations could be performed by a remote device (e.g., peer, server, cloud, etc.).

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In some embodiments, memory 108 can include one or a combination of computer readable media. Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media. In various embodiments, memory 108 is an example of a computer storage medium storing computer-executable instructions that, when executed by processor(s) 104, configure the processor(s) to, among other things, receive a gesture input from a touch input device (e.g., input/output interfaces 106), decompose the gesture input into segments, determine (e.g., using a look-up table maintained in encryption key module 118) alphanumeric elements that correspond to each of the segments; and assemble the alphanumeric elements into an encryption password.

Computing device 100 can include one or more input/output (I/O) interfaces 106 to allow the computing device 100 to communicate with other devices. In various embodiments, input/output interfaces 106 can comprise touch input devices such as a direct-touch input device (e.g., a touch screen) or an indirect-touch device (e.g., a touch pad). Such touch input devices can detect time sequences of touches or swipes (e.g., order of swipes), start and stop points of swipes, and positions of such points with respect to edges and/or size of the touch input device.

In other embodiments, input/output interfaces 106 can comprise an indirect input device (e.g., a mouse, keyboard, a camera or camera array, etc.) or another type of non-tactile device, such as an audio input device. Input/output interfaces 106 can also include one or more network interfaces to enable communications between computing device 100 and other networked devices such as other device 100. Input/output interfaces 106 can allow a device 100 to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like).

Figure 2:
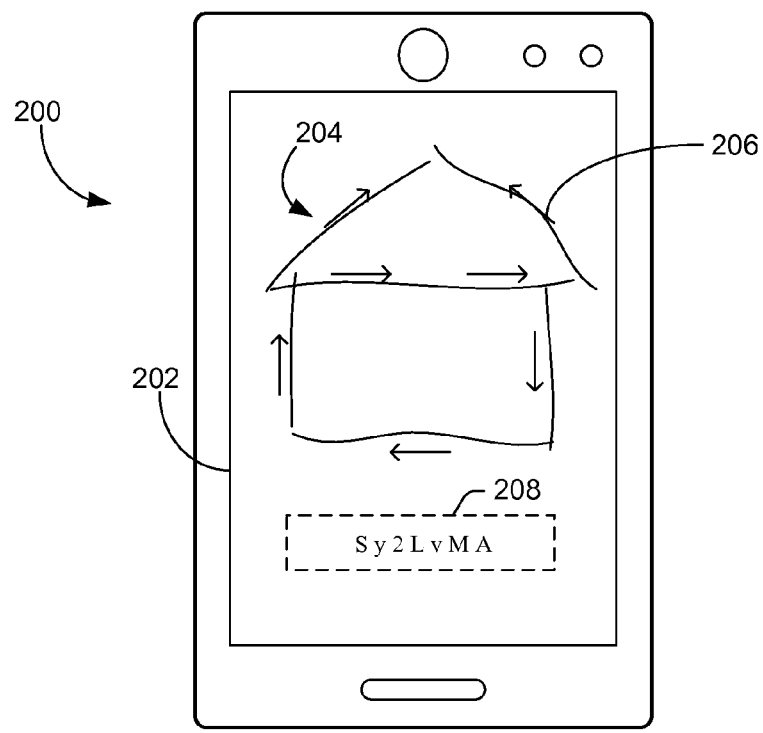
FIG. 2 is a sketch of a computing device, according to some embodiments.

FIG. 2 is a sketch of a computing device 200, according to some embodiments. Computing device 200, which is similar to or the same as any of computing device 100 discussed previously, includes a touch display 202, which can comprise a touch input device, touch pad, or a gestural input device, just to name a few examples.

A user can swipe the touch surface of touch display 202 with one or more fingers to input a touch gesture 204 to computing device 200. Touch gesture 204 can comprise one or more partial gestures 206. In other words, a gesture 204 can be pieced together from a number of partial gestures 206 that each correspond to swipes of one or more fingers of the user. For example, gesture 204 resembles a profile of a house formed from partial gestures corresponding to walls, partial gestures corresponding to roof lines, and a partial gesture corresponding to the ground. Each of the partial gestures can be generated by a finger swipe on touch display 202.

As described previously, gestures can include a series or a set of partial gestures. As used herein, a gesture is a collection of partial gestures each produced by a swipe on a touch input device. Individual partial gestures 206 are electronically converted to segments, which correspond to one or more alphanumeric characters, depending, in part, on the type of segment (e.g., vertical line, diagonal line, and so on). Accordingly, gesture 204 can be converted to an alphanumeric word, which can subsequently be used as an encryption key 208, which can be displayed in touch display 202.

Direction of the finger swipes, examples of which are indicated by arrows, can further distinguish among segment types. Thus, for example, a vertical line segment generated by an upward finger swipe can correspond to one letter while a vertical line segment generated by a downward finger swipe can correspond to another letter. Moreover, a portion of a gesture appearing to be a single line can comprise two or more lines end to end, each corresponding to a segment. Thus, as illustrated by example, encryption key 208 comprises "S", "y", "2", "L", "v", "M", and "A", which correspond (e.g., via a look-up table) to the individual segments 206.

Figure 3:
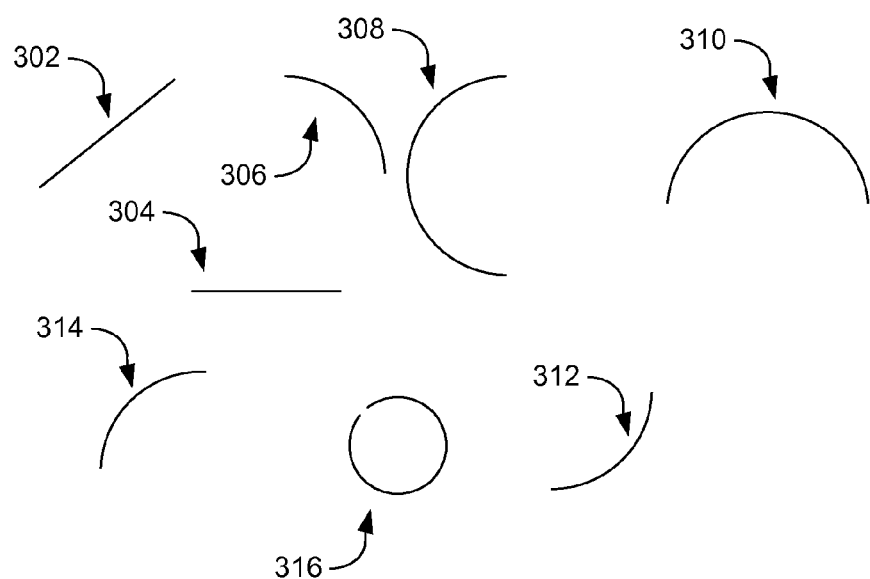
FIG. 3 illustrates a number of example gesture swipes, according to some embodiments.

FIG. 3 illustrates a number of example partial gesture swipe configurations, according to some embodiments. A user can swipe a touch surface of a touch display one or more consecutive times with one or two fingers to generate a touch gesture. Each individual swipe can be considered to be a partial gesture. Swipe configurations can fit into any of a number of categories including, among other things, a diagonal line 302, a horizontal line 304, first-quadrant quarter circle 306, open-right semicircle 308, open-down semicircle 310, fourth-quadrant quarter circle 312, second-quadrant quarter circle 314, and full circle 316. Moreover, such swipe configurations can be further categorized as being swipes by one finger or two fingers. In addition, such swipe configurations can be further categorized as being swipes in a right-to-left or left-to-right direction (e.g., for straight line swipes) or in a clockwise or counter clockwise direction (e.g., for circular swipes). Accordingly, the eight example swipes and the four possible characteristics for each of the swipes (e.g., one finger and upward, two fingers and upward, one finger and downward, or two fingers and downward) can represent 32 distinct segment categories, each corresponding to a different alphanumeric character. Of course, other swipe configurations are possible, so an even higher number of different alphanumeric characters can be represented by different swipes. In this example, the number of different six-character words that can be generated for encryption keys from 32 distinct segment categories or types exceeds a billion. In another example, the number of different six-character words that can be generated for encryption keys from 100 distinct segment categories or types exceeds 10^16.

Figure 4A:
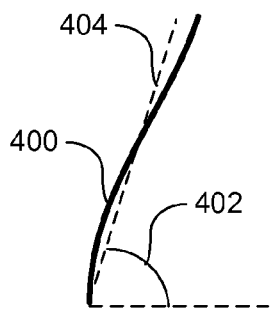
FIGS. 4A-4D are schematic diagrams of a process for applying angle thresholds to gesture segments, according to some embodiments.
Figure 4B:
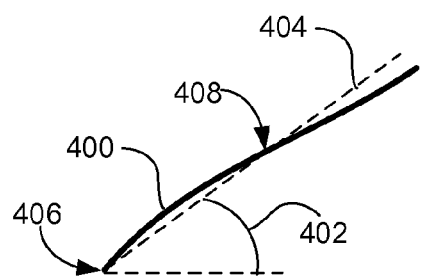
Figure 4C:
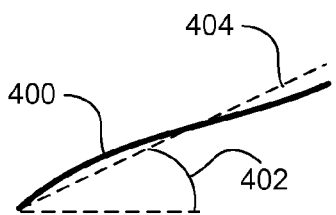
Figure 4D:
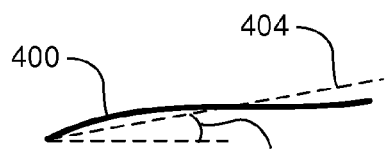

FIGS. 4A-4D are schematic diagrams of a process for comparing angle thresholds to gesture segment angles, according to some embodiments. For example, a gesture swipe configuration can comprise a line 400, and whether line 400 is categorized as a horizontal line segment, a vertical line segment, or a diagonal line segment can be based, at least in part, on an angle threshold. For example, line 400 is categorized as a horizontal line segment if angle 402, defined as an angle between a horizontal reference axis and line 400, is less than 30 degrees. Further, line 400 is categorized as a diagonal line segment if angle 402 is between 30 degrees and 60 degrees. Still further, line 400 is categorized as a vertical line segment if angle 402 is greater than 60 degrees. Thus, as illustrated in the examples of the figures, line segment 400 of FIG. 4A is categorized as a vertical line, line segment 400 of FIG. 4B is categorized as a diagonal line, line segment 400 of FIG. 4C is categorized as a diagonal line if angle 402 is greater than 30 degrees or is categorized as a horizontal line if angle 402 is less than 30 degrees, and line segment 400 of FIG. 4D is categorized as a horizontal line.

A swipe by a user cannot be expected to be precise. For example, a user may intend to generate a straight line swipe, but the user's finger is not likely to follow a precisely straight line. Similar is the case for other swipe configurations: a user may intend to generate a quarter circle swipe, but the user's finger is not likely to follow a precisely circular arc, and so on. Line 400 is an example of an imprecise line swipe generated by a user. Though any of a number of techniques can be used, a particular technique for defining a straight line from an imprecise line swipe involves generating a virtual line 404 connecting one end point 406 to a midpoint 408 of line 400, as illustrated in FIG. 4B, for example. Such a virtual line can then be used to determine angle 402 for comparing to a threshold angle.

Figure 5A:
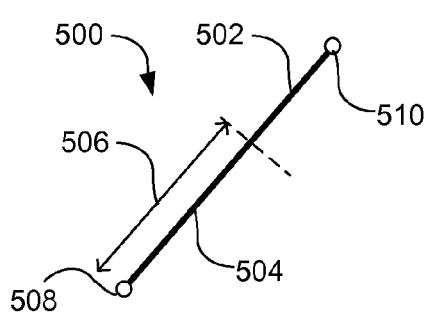
FIGS. 5A and 5B are schematic diagrams of a process for applying length thresholds to gesture segments, according to some embodiments.
Figure 5B:
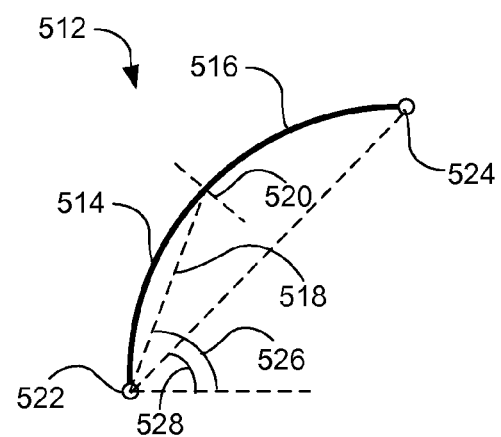

FIGS. 5A and 5B are schematic diagrams of a process for comparing length thresholds to gesture segment lengths, according to some embodiments. For example, referring to FIG. 5A, a gesture swipe configuration can comprise a line 500, and whether line 500 is categorized as a single line segment or as two individual line segments 502 and 504 (arranged end to end) can be based, at least in part, on a length threshold 506, which can be defined in terms of a percentage of the size of a touch input device used to generate the gesture segment in question. For example, line 500 is categorized as a single line segment if its length between endpoints 508 and 510 is less than length threshold 506, defined to be 50% of the width of the touch input device used to generate line 500. Further, line 500 is categorized as two individual line segments 502 and 504 if its length is greater than length threshold 506. (Such determination of the number of individual lines in a line segment can be extended to determining a number of individual lines greater than two, involving more than one length threshold, for example.) Thus, as illustrated in the example of FIG. 5A, line segment 500 is categorized as two individual line segments 502 and 504 since the length of line 500 is greater than length threshold 506.

Referring to FIG. 5B, a gesture swipe configuration can comprise an arc 512, and whether arc 512 is categorized as a quarter circle segment, a one-eighth circle segment, or as two individual line segments 514 and 516 (arranged end-to-end) can be based, at least in part, on a length threshold 518 and an angle threshold. Length threshold 518 can be defined as a midpoint 520 between endpoints 522 and 524 of arc 512. The angle threshold can be defined as a difference between angles 526 and 528, wherein angle 526 is defined as the angle between a horizontal reference axis and a line from endpoint 522 and midpoint 520 and wherein angle 528 is defined as the angle between the horizontal reference axis and a line from endpoint 522 and endpoint 524. Such a difference between angles 526 and 528 indicates a degree of curvature of arc 512. Thus, if the difference between angles 526 and 528 of arc 512 is relatively small, arc 512 can be categorized as a straight line segment. On the other hand, if the difference between angles 526 and 528 of arc 512 is relatively large, arc 512 can be categorized as a curve or circular arc segment.

For example, arc 512 is categorized as a one-eighth circle segment if its length is less than length threshold 518 and the difference between angles 526 and 528 is greater than a first angle threshold. Further, arc 512 is categorized as a quarter circle if its length is greater than length threshold 518 and the difference between angles 526 and 528 is greater than a second angle threshold. Still further, arc 512 is categorized as a half circle if its length is greater than length threshold 518 and the difference between angles 526 and 528 is greater than a third angle threshold, and so on. Even further, arc 512 is categorized as two individual line segments 514 and 516 if its length is greater than length threshold 518 and the difference between angles 526 and 528 is less than the first angle threshold.

FIGS. 6A and 6B illustrate an example touch gesture before and after a process that modifies a set of gesture swipes, according to some embodiments. A swipe by a user cannot be expected to be precise since the user's finger can inadvertently deviate from an intended path, depending in part, for example, on the attention the user gives to the swipe or to a level of dexterity of the user. Thus, the user may intend to generate a straight line swipe, but the user's finger is not likely to follow a precisely straight line. Similar is the case for other swipe configurations: a user may intend to generate a half circle swipe, but the user's finger is not likely to follow a precisely circular arc with a length of exactly half the perimeter of a circle, and so on.

In FIG. 6A, touch gesture 600 comprises a number of partial gestures, such as 602. In other words, gesture 600 is an assembly of partial gestures that each correspond to swipes of one or more fingers of the user. The partial gestures may be determined by a process of decomposing touch gesture 600, as described further herein. For example, gesture 600 resembles a profile of a house formed from partial gestures corresponding to walls 602, partial gestures corresponding to roof lines 604, a partial gesture corresponding to an eave 606, and a partial gesture corresponding to the ground 608. Each of the partial gestures can be generated by a finger swipe on a touch display. These partial gestures are examples of imprecise line swipe generated by the user, since the lines of the touch gesture are visibly nonlinear. Though any of a number of techniques can be used, a particular technique for defining a straight line from an imprecise line swipe involves generating a virtual line connecting one end point of the line swipe to a midpoint of the line swipe, as explained previously. These techniques can be useful for a process of categorizing partial gestures generated from imprecise swipes. Such categorizing determines whether a partial gesture is a line or a one-eighth circle, for example.

In some embodiments, decomposing touch gesture 600 into partial gestures involves detecting changes in path direction and/or starts-stops of swipes comprising gesture input. For example, a swipe leading to a partial gesture corresponding to ground 608 can be a single swipe from right to left. In another case, the swipe can be two short swipes that involved a start-stop during the swipe, such as a pause. In another example, partial gesture of wall 602 and partial gesture of ground 608 can be generated by a single swipe with a course change at an apex of wall 602 and ground 608. Accordingly, identifying segments corresponding to the partial gestures of touch gesture 600 can be based, at least in part, on detecting course changes and/or starts-stops. In some implementations, course changes and/or starts-stops can be used with angle thresholds and/or length thresholds to categorize each of the segments.

FIG. 6B, for example, illustrates a touch gesture 610 comprising a series of virtual line swipes based on the series of imprecise line swipes of touch gesture 600. In some implementations, a touch gesture generated by a user can be displayed in real time as the user swipes a touch input display device (e.g., touch display 202 in FIG. 2). After a predetermined delay time, the touch input display device can display the completed touch gesture modified by a process that "cleans-up" the imprecise gesture as generated by the user. In such a case, the user can review the modified gesture and have an opportunity to redo the touch gesture if the modified gesture is not the user's intended gesture (e.g., misinterpretation of a partial gesture by the modifying technique).

Direction of the finger swipes of touch gesture 600 are indicated by arrows in FIGS. 6A and 6B. Direction of finger swipes can further distinguish among segment types corresponding to the partial gestures. Thus, for example, a vertical line segment generated by an upward finger swipe 612 can correspond to one letter while a vertical line segment generated by a downward finger swipe 602 can correspond to another letter.

FIG. 7 is a table 700 of gesture segments and corresponding code elements, according to various embodiments. For example, table 700 can comprise a look-up table stored in memory of encryption key module 118 of computing device 100, illustrated in FIG. 1. Table 700 merely is a portion of a larger table that can include a relatively large number of elements. Gesture segments are listed in one column and corresponding code elements are listed in the other column. Code elements are grouped into a word that can be used as an encryption key or password. The word can include any number of code elements, such as five, six, or more.

Gesture segments are based, at least in part, on partial gestures generated by finger swipes by a user on a touch input device. In some implementations, the gesture segments can be partial gestures that have been modified by techniques described previously, for example. Code elements comprise alphanumeric characters, such as letters, numbers, punctuation characters, symbols, and so on.

Gesture elements in table 700 are distinguished from one another by swipe direction, indicated by arrows in table 700. Thus, for example, a vertical line gesture element with an upward swipe corresponds to "L", in this particular table example, whereas a vertical line gesture element with a downward swipe corresponds to "I". Similarly, a horizontal line gesture element with a right-to-left swipe corresponds to "K", whereas a horizontal line gesture element with a left-to-right swipe corresponds to "R". Further, a diagonal line gesture element with an upward, right-to-left swipe corresponds to "Q", whereas a diagonal line gesture element with an upward, left-to-right swipe corresponds to "J".

Figure 8:

FIG. 8 is a table 800 of gesture segments and corresponding code elements, according to various embodiments. Table 800 is similar to table 700 except that gesture elements in table 700 are distinguished from one another by swipe direction, whereas gesture elements in table 800 are not distinguished from one another by swipe direction. Accordingly, the number of distinguishable gesture segments and corresponding code elements in the latter case is less than in the former case, all other things being equal.

Figure 9:

FIG. 9 is a table 900 of gesture segments and corresponding code elements, according to various embodiments. Table 900 is similar to table 700 except that gesture elements in table 700 are distinguished from one another by swipe direction, whereas gesture elements in table 900 are distinguished from one another by occurrence number. In the latter case, the sequence of swipes by a user is recorded so that a first occurrence of a vertical swipe, for example, can be distinguished from a second occurrence of a vertical swipe, and so on. Thus, for example, a first swipe that generates a vertical line gesture element corresponds to "L", in this particular table example, whereas a second swipe that generates a vertical line gesture element corresponds to "I". Similarly, a first swipe that generates a horizontal line gesture element corresponds to "R", whereas a second swipe that generates a horizontal line gesture element corresponds to "K". In other embodiments, a combination of swipe occurrence and swipe direction can be used to distinguish gesture elements from one another, for example.

FIG. 10 is a table 1000 of gesture segments and corresponding code elements, according to various embodiments. Gesture segments are based, at least in part, on partial gestures generated by finger swipes by a user on a touch input device. Such finger swipes can involve one finger or two fingers. Gesture elements in table 1000 are distinguished from one another by a number of different swipe or touch actions including, but not limited to, one-finger swipe, two-finger swipe, endpoint taps, pinching, and so on. Thus, for example, a swipe with one finger that generates a vertical line gesture element corresponds to "L", in this particular table example, whereas a swipe with two fingers that generates a vertical line gesture element corresponds to "J". A vertical pinching action corresponds to "R", whereas two substantially simultaneous finger taps oriented vertically correspond to "K". In other embodiments, a combination of swipe occurrence, swipe direction, number of swipe fingers, and so on can be used to distinguish gesture elements from one another, for example.

Figure 11:
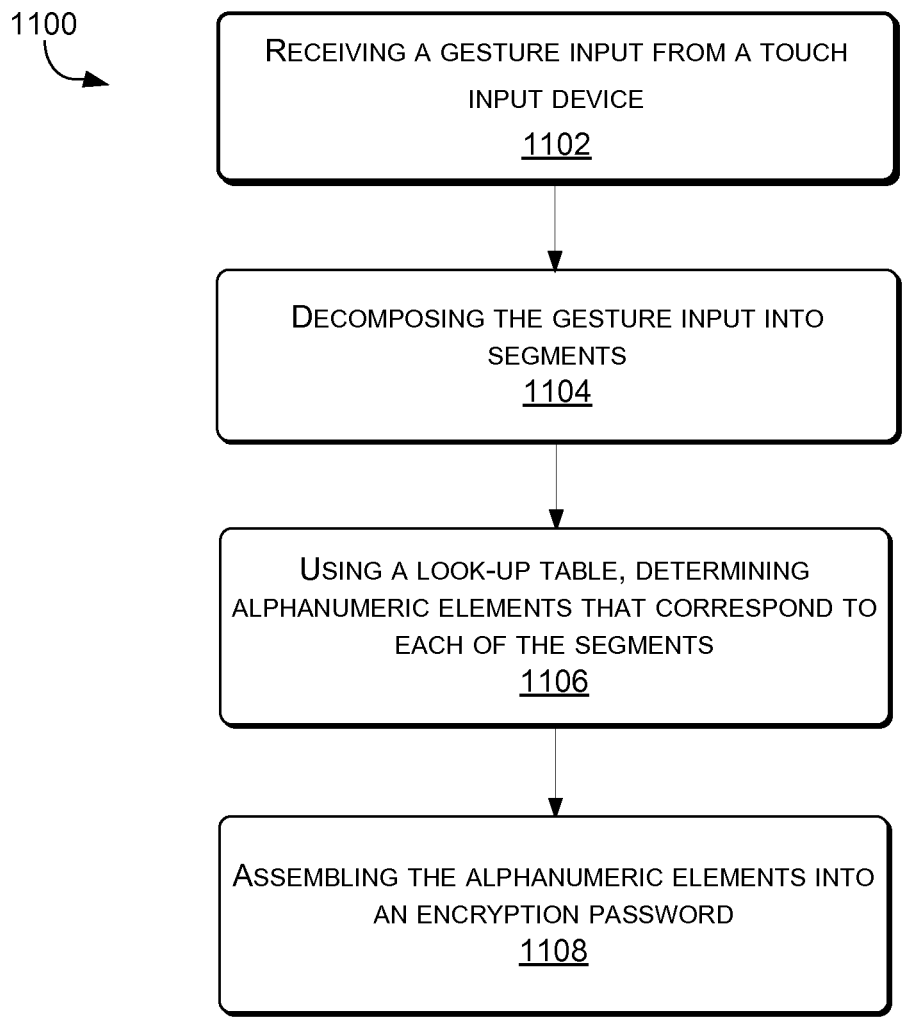
FIG. 11 is a flow diagram of a process for generating an encryption password using a touch gesture, according to some embodiments.

FIG. 11 is a flow diagram of a process 1100 for generating an encryption password using a touch gesture, according to some embodiments. At block 1102, a gesture input is received from a touch input device, such as touch display 202 of computing device 200, illustrated in FIG. 2, for example. At block 1104, the gesture input is decomposed into segments. For example, techniques described in reference to FIGS. 4 through 6 can be used to perform such decomposition. At block 1106, alphanumeric elements that correspond to each of the segments can be determined by referring to a look-up table, which can be stored in memory of a computing device. In particular, such a look-up table can be stored in encryption key module 118, illustrated in FIG. 1. At block 1108, the determined alphanumeric elements can be assembled into an encryption password comprising a plurality of the alphanumeric elements.

As used herein, the term "module" or "block" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although specific embodiments have been illustrated and described herein, it is noted that a wide variety of alternate and/or equivalent implementations may be substituted for the specific embodiment illustrated and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A method comprising:
  receiving an input from a touch input device, wherein the input corresponds to one of a plurality of gestures produced by a user based on the user swiping a pattern on a surface of the touch input device; and
  after a predetermined time subsequent to receiving the input,
    (i) displaying for review by the user a particular gesture of the plurality of gestures, wherein the particular gesture is obtained by adjusting the pattern swiped by the user on the surface of the touch input device,
    (ii) providing an opportunity for the user to swipe a pattern on the surface of the touch input device if the particular gesture is not a gesture intended by the user; and
  responsive to the particular gesture being a gesture intended by the user,
    (iii) decomposing the particular gesture into a plurality of segments,
    (iv) searching in a look-up table that comprises (a) a list of pre-classified segments and (b) alphanumeric elements that correspond to each of the pre-classified segments in the list,
    (v) based, at least in part, on the search in the look-up table, determining alphanumeric elements that correspond to the plurality of segments of the particular gesture, and
    (vi) assembling the alphanumeric elements into an encryption password.

2. The method of claim 1, wherein decomposing the particular gesture into the plurality of segments comprises:
  detecting at least one of (i) changes in path direction of the pattern swiped on the surface of the touch input device and (ii) starts-stops of the pattern swiped on the surface of the touch input device;
  identifying the plurality of segments of the pattern swiped on the surface of the touch input device based, at least in part, on detecting at least one of (i) the changes in path direction of the pattern swiped on the surface of the touch input device and (ii) the starts-stops of the pattern swiped on the surface of the touch input device; and comparing (i) angle thresholds to angles of each of the plurality of segments or (ii) length thresholds to lengths of each of the plurality of segments to categorize each of the plurality of segments.

3. The method of claim 2, wherein the length thresholds are (i) defined in terms of a percentage of a size of the touch input device or (ii) based, at least in part, on the size of the touch input device.

4. The method of claim 1, further comprising:
encrypting a document with the encryption password to generate an encrypted document; and
transmitting the encrypted document onto at least one of (i) a public file sharing website and (ii) a private communications network.

5. The method of claim 1, further comprising:
determining a number of fingers of the user used to generate the pattern swiped on the surface of the touch input device.

6. The method of claim 1, further comprising:
based, at least in part, on the pattern swiped on the surface of the touch input device, determining start and stop positions of the plurality of segments on the touch input device.

7. The method of claim 1, wherein each of the plurality of segments comprises one or more of the following clockwise quarter-circle, counterclockwise quarter-circle, single line, double line, or diagonal line.

8. A system comprising:
a touch input device;
a memory device including a look-up table, wherein the look-up table comprises (i) a list of gesture segments and (ii) alphanumeric elements that correspond to each of the gesture segments; and
a processor configured to
receive an input from the touch input device, wherein the input corresponds to one of a plurality of gestures produced by a user based on the user swiping a pattern on a surface of the touch input device,
after a predetermined time subsequent to receiving the input,
(i) display for review by the user a particular gesture of the plurality of gestures, wherein the particular gesture is obtained by adjusting the pattern swiped by the user on the surface of the touch input device, and
(ii) provide an opportunity for the user to swipe a pattern on the surface of the touch input device if the particular gesture is not a gesture intended by the user, and
responsive to the particular gesture being a gesture intended by the user,
(i) decompose the particular gesture into a plurality of segments,
(ii) search in the look-up table for the plurality of segments,
(iii) based, at least in part, on the searching in the look-up table, determine alphanumeric elements that correspond to the plurality of segments of the particular gesture, and
(iv) assemble the alphanumeric elements into an encryption password.

9. The system of claim 8, wherein the processor is further configured to:

detect at least one of (i) changes in path direction of the pattern swiped on the surface of the touch input device and (ii) starts-stops of the pattern swiped on the surface of the touch input device;

identify the plurality of segments of the pattern swiped on the surface of the touch input device based, at least in part, on detecting at least one of (i) the changes in path direction of the pattern swiped on the surface of the touch input device and (ii) the starts-stops of the pattern swiped on the surface of the touch input device; and compare (i) angle thresholds to angles of each of the plurality of segments or (ii) length thresholds to lengths of each of the plurality of segments to categorize each of the plurality of segments.

10. The system of claim 9, wherein the length thresholds are (i) defined in terms of a percentage of a size of the touch input device or (ii) based, at least in part, on the size of the touch input device.

11. The system of claim 8, wherein the processor is further configured to:
encrypt a document with the encryption password to generate an encrypted document; and
transmit the encrypted document onto at least one of (i) a public file sharing website and (ii) a private communications network.

12. The system of claim 8, wherein the processor is further configured to:
determine a number of fingers of the user used to generate the pattern swiped on the surface of the touch input device.

13. The system of claim 8, wherein the processor is further configured to:
determine start and stop positions of the plurality of segments on the touch input device based, at least in part, on the pattern swiped on the surface of the touch input device.

14. The system of claim 8, wherein each of the plurality of segments comprises one or more of the following clockwise quarter-circle, counterclockwise quarter-circle, single line, double line, or diagonal line.

15. A non-transitory computer-readable storage medium storing computer-executable instructions that, when executed by a processor, configure the processor to perform operations comprising:
receiving an input from a touch input device, wherein the input corresponds to one of a plurality of gestures produced by a user based on the user swiping a pattern on a surface of the touch input device; and
after a predetermined time subsequent to receiving the input,
(i) displaying for review by the user a particular gesture of the plurality of gestures, wherein the particular gesture is obtained by adjusting the pattern swiped by the user on the surface of the touch input device, and
(ii) providing an opportunity for the user to swipe a pattern on the surface of the touch input device if the particular gesture is not a gesture intended by the user; and
responsive to the particular gesture being a gesture intended by the user,
(iii) decomposing the particular gesture into a plurality of segments,
(iv) searching in a look-up table that comprises (a) a list of gesture segments and (b) alphanumeric elements that correspond to each of the gesture segments, (v) based, at least in part, on the search in the look-up table, determining alphanumeric elements that correspond to the plurality of segments of the particular gesture, and (vi) assembling the alphanumeric elements into an encryption password.

16. The non-transitory computer-readable storage medium of claim 15, the operations further comprising:
applying the encryption password to a document; and
transmitting the document onto at least one of (i) a public file sharing website and (ii) a private communications network.

17. The non-transitory computer-readable storage medium of claim 15, the operations further comprising:
determining a number of fingers of the user used to generate the pattern swiped on the surface of the touch input device.

18. The non-transitory computer-readable storage medium of claim 15, the operations further comprising:
determining start and stop positions of the plurality of segments on the touch input device based, at least in part, on the pattern swiped on the surface of the touch input device.

19. The non-transitory computer-readable storage medium of claim 15, wherein each of the segments of the particular gesture comprises one or more of the following: clockwise quarter-circle, counterclockwise quarter-circle, single line, double line, or diagonal line.

20. The non-transitory computer-readable storage medium of claim 15, wherein decomposing the particular gesture into the plurality of segments comprises:
detecting at least one of (i) changes in path direction of the pattern swiped on the surface of the touch input device and (ii) starts-stops of the pattern swiped on the surface of the touch input device;
identifying the plurality of segments of the pattern swiped on the surface of the touch input device based, at least in part, on detecting at least one of (i) the changes in path direction of the pattern swiped on the surface of the touch input device and (ii) the starts-stops of the pattern swiped on the surface of the touch input device; and
comparing (i) angle thresholds to angles of each of the plurality of segments or (ii) length thresholds to lengths of each of the plurality of segments to categorize each of the plurality of segments.

* * * * *